Aug. 17, 1965  E. P. MOODY  3,201,018
PIPE HOLDER
Filed Dec. 2, 1963  4 Sheets-Sheet 1
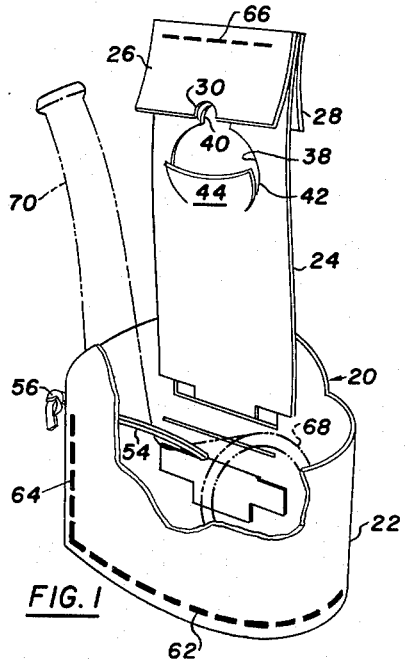
FIG. 1
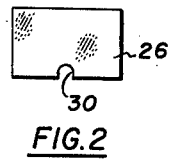
FIG. 2
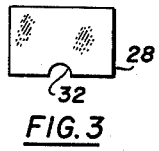
FIG. 3
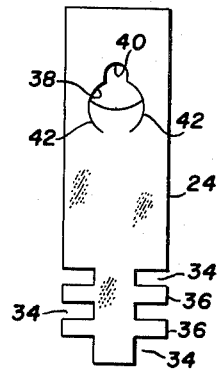
FIG. 4
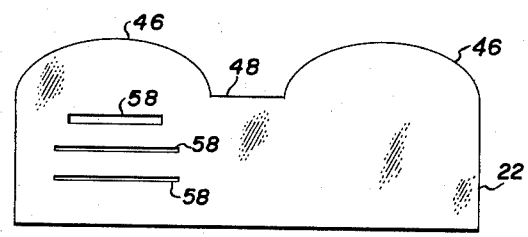
FIG. 5
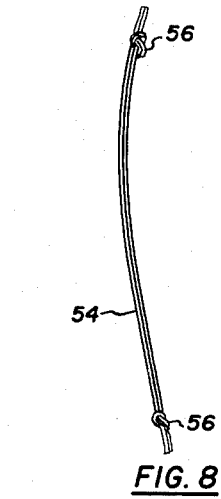
FIG. 8
FIG. 6
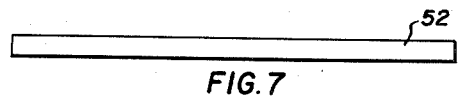
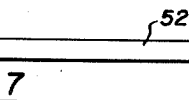
FIG. 7
INVENTOR.
EUGENE P. MOODY
BY
Caesar and Rivise
ATTORNEYS.

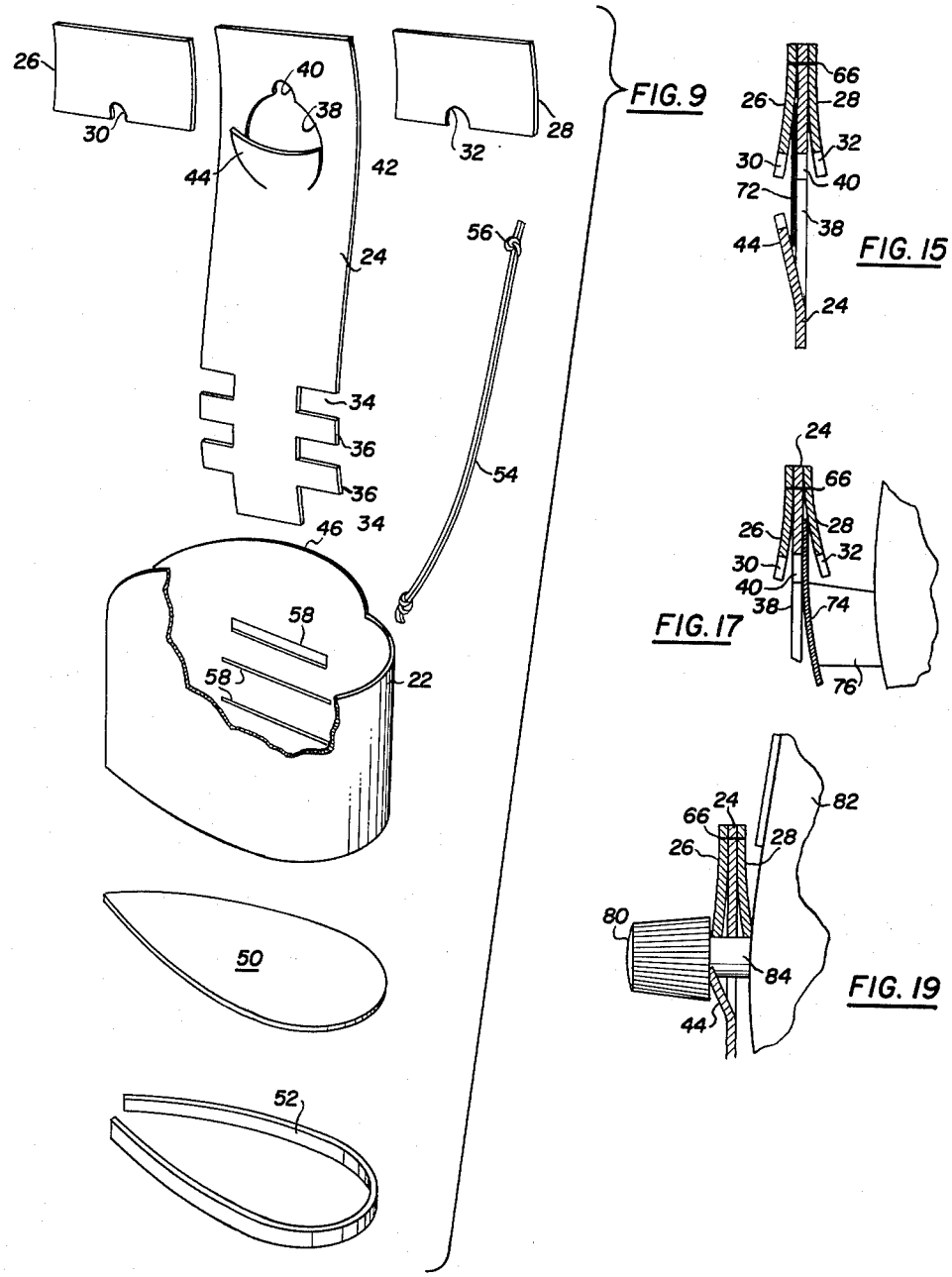

Aug. 17, 1965

E. P. MOODY 3,201,018

PIPE HOLDER

Filed Dec. 2, 1963

INVENTOR.
EUGENE P. MOODY

BY

*Caesar and Rivise*

ATTORNEYS.

Aug. 17, 1965   E. P. MOODY   3,201,018
PIPE HOLDER

Filed Dec. 2, 1963   4 Sheets-Sheet 4

INVENTOR.
EUGENE P. MOODY
BY
*Caesar and Rivise*
ATTORNEYS.

United States Patent Office 3,201,018
Patented Aug. 17, 1965

3,201,018
PIPE HOLDER
Eugene P. Moody, 1736 Rockwell Road, Abington, Pa.
Filed Dec. 2, 1963, Ser. No. 327,219
11 Claims. (Cl. 224—26)

This invention relates to a pipe holder. More particularly, it is a pipe holder which is adapted primarily to support a pipe within an automobile.

The pipe holder of this invention is also adapted to being worn as an article of apparel or it can be suspended from a golf cart or like piece of equipment. Thus it can be used as a receptacle for holding a lit pipe temporarily during various activities, such as playing golf.

A particular problem of pipe smokers is where to place a pipe within an automobile. The ash tray has proved to be unacceptable since it results in scratching of the pipe. Additionally, whenever a car would hit a bump, there was a likelihood that the pipe would bounce out of the ash tray.

One solution to this problem which has been made is the production of a pipe holder having a magnetic base and a pair of spring clips for holding the pipe. However, there are a number of shortcomings to this device. In the first place, most of the modern cars have padded dashboards. Thus, there would be no place for holding the magnet in place. Secondly, there is also the danger of scratching the surface of the pipe with the spring clips.

The pipe holder of this invention will safely support a pipe within a car but does not sufer from the disadvantages of the aforementioned magnetic pipe holder.

It is therefore a object of this invention to provide a novel pipe holder.

It is another object of this invention to provide a pipe holder for supporting a pipe within a car.

It is a further object of this invention to provide a pipe holder which is decorative in appearance and can be worn by the user.

It is a further object of this invention to provide a pipe holder which can be taken apart and collapsed for ease of shipment, packaging, or storage by the user.

These and other objects of this invention are accomplished by providing a pipe holder comprising a pouch for holding the pipe, supporting means for said pouch, and means for securing said supporting means onto a supporting object.

Other objects and many of the attendant advantages of this invention will be readily appreciated as the same becomes better understood by reference to the following detailed description when considered in connection with the accompanying drawings wherein:

FIG. 1 is a perspective view of the pipe holder of this invention, partially broken away, and showing a pipe in phantom;

FIG. 2 is a front elevational view of the front tab used for supporting and securing the pipe holder;

FIG. 3 is a front elevational view of the rear tab for supporting and securing the pipe holder;

FIG. 4 is a front elevational view of the supporting strap of the pipe holder;

FIG. 5 is a front elevational view of the blank used for making a pouch of the pipe holder;

FIG. 6 is a top plan view of the bottom of the pipe holder;

FIG. 7 is a front elevational view of a strip used for forming a ridge in the bottom of the pouch;

FIG. 8 is a perspective view of a thong used for maintaining the pipe in place within a pouch;

FIG. 9 is an exploded perspective view of the elements of the pipe holder of this invention prior to assembly;

FIG. 15 is an enlarged sectional view taken along the line 15—15 of FIG. 14;

FIG. 17 is an enlarged sectional view taken along the line 17—17 of FIG. 16;

FIG. 19 is an enlarged sectional view taken along the line 19—19 of FIG. 18.

Figure 10:
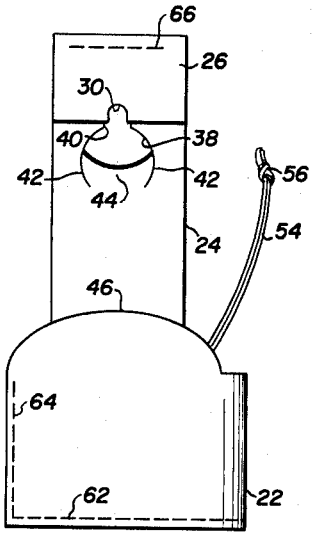
FIG. 10 is a front elevational view of the pipe holder of this invention without the pipe.

Referring now in greater detail to the various figures of the drawings wherein similar reference characters refer to similar parts, a pipe holder embodying the present invention is generally shown at 20 in FIG. 1. Device 20 basically comprises a pouch 22, a supporting strap 24 and a pair of dependent tabs 26 and 28 secured to the top of supporting strap 24.

As seen in FIG. 2, front depending tab 26 is basically rectangular and has a small arcuate opening 30 in the bottom thereof. As seen in FIG. 3, tab 28 is also basically rectangular and the same size as tab 26 and has an arcuate opening 32 in the bottom thereof. Opening 32 is larger than opening 30, for a reason to be explained hereinafter.

Supporting strap 24 is shown in FIG. 4 and is basically rectangular in shape. A plurality of rectangular lateral openings 34 are formed in the bottom of strap 24 leaving laterally extending fingers 36. A substantially semicircular opening 38 is formed in the upper central portion of strap 24. An arcuate opening 40 extends upwardly from opening 38. Opening 40 is identical in shape to opening 32 in tab 28. A pair of cuts 42 extend downwardly from opening 38 leaving a movable tab 44 (FIG. 1). As seen in FIG. 4, cuts 42 are circumferential extensions of the outer wall of opening 38.

The blank from which the walls of pouch 22 are formed is shown in FIG. 5. The blank is basically rectangular but includes a pair of arcuate upstanding shoulders 46 at the top thereof. These shoulders are spaced by a horizontal top surface 48. The bottom of the pouch is shown at 50 in FIG. 6 and is basically tear-drop shaped. In FIG. 7 strip 52 is shown which is used for supporting the bottom 50 of the pouch. In FIG. 8 a leather thong 54 is shown having knots 56 on both ends. The purpose of the thong will be explained hereinafter.

Figure 13:
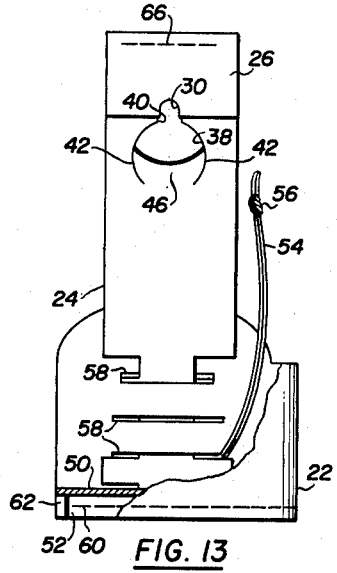
FIG. 13 is a front elevational view of the pipe holder with parts broken away for the purpose of clarity.

The assembly of the pipe holder of this invention is best seen in FIGS. 1, 9 and 13. As seen in FIG. 9, pouch 22 is provided with three equally spaced horizontal slots 58 in the rear thereof. The uppermost slot 58 is slightly larger in height than the other two slots in order to facilitate the entry of supporting strap 24. After the slots have been formed strip 52 is secured to the bottom of the pouch blank as by stitching 60 (see FIG. 13). Strip 52 is slightly shorter than the length of pouch 22 thereby leaving open areas 62 (FIG. 13) at the outer ends of the pouch blank. Thereafter, the pouch blank is bent and the open ends are held together thereby automatically forming the tear-drop shape shown in FIGS. 1 and 9. The open ends are then secured in place as by stitching 64.

With the pouch formed as described, strip 52 provides a rim around the entire bottom of the pouch. Thereafter, bottom 50 is merely pushed in place and is held there solely by resting on the rim 52. Since the pouch is made of a resilient material, bottom 50 cannot be inadvertently removed.

Supporting strap 24 is then secured in pouch 22 by passing the lower portion through uppermost slot 58 and then passing lowermost fingers 36 through lowermost slot 58. The middle slot 58 is provided for adjusting the height of the pouch with respect to the supporting strap. Thus, if it is desired to have the pouch at a lower position on the strap only the upper and middle slots will be used. Likewise in some circumstances, only the upper slots need be used. Also, strap 24 can be cut so as to have only its bottom lip pass through the lower slot 58, without having fingers 36 pass therethrough.

Another feature of this invention is the fact that the passing of the strap through two of the slots prevents any pivotal moving of the pouch with respect to the strap.

The pouch is completed by securing tab 26 on the front of strap 24 and tab 28 on the rear of strap 24. This securement can be obtained by any conventional means such as stitching 66. With the tabs secured in place, opening 30 in tab 26 is aligned with opening 40 in supporting strap 24. Likewise, opening 32 in tab 28 is aligned with opening 40 in strap 24. The final step in the assembly is the passing of one knotted end 56 of thong 54 through the lowermost or middle slot 58 in pouch 22.

Figure 11:
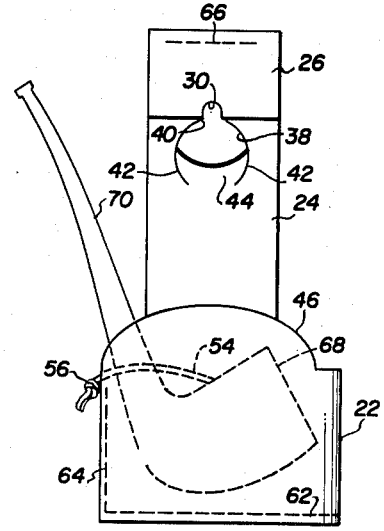
FIG. 11 is a front elevational view of the pipe holder of this invention with the pipe in place.
Figure 12:
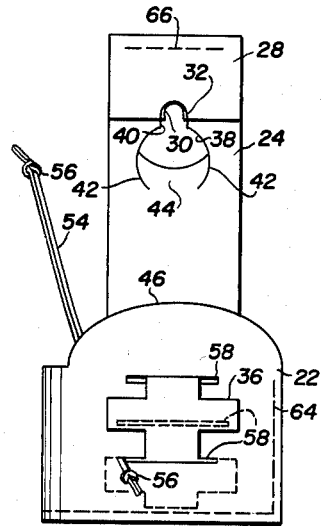
FIG. 12 is a rear elevational view of the pipe holder of this invention.

In use, a pipe 68 is placed within pouch 22, with the stem 70 being adjacent stitched edge 64. As seen in FIGS. 1 and 11, the pipe is held in place by passing thong 54 over the bowl of the pipe and through the upper unjoined portion of the outer edges of pouch 22. Thus, it is seen that since pouch 22 is formed of a resilient material, the thong will be held securely in place. Knot 56 prevents the inadvertent moving out of the thong. Whenever it is desired to move the pipe, the thong is merely lifted from between the edges of the pouch so that the pipe can be lifted out. In many instances, however, it will not be necessary to secure the pipe in place and the thong need not be used. Thus, the pipe can be supported by the pouch 22.

Figure 14:
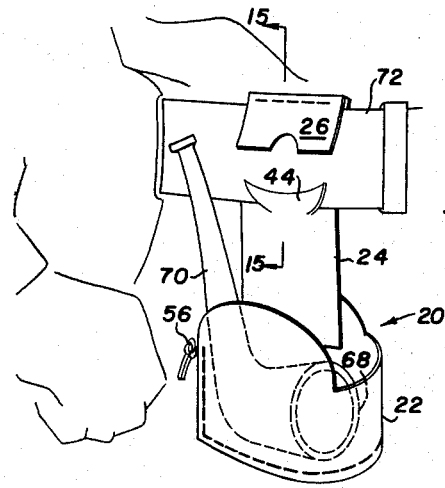
FIG. 14 is a perspective view showing the pipe holder of this invention as suspended from a belt.
Figure 16:
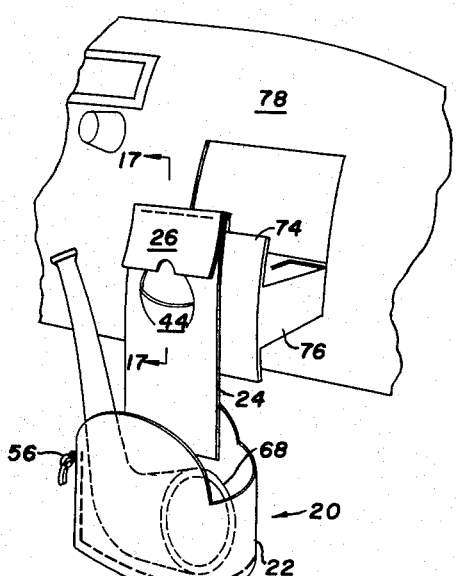
FIG. 16 is a perspective view showing the pipe holder of this invention suspended from the ash tray of an automobile.
Figure 18:
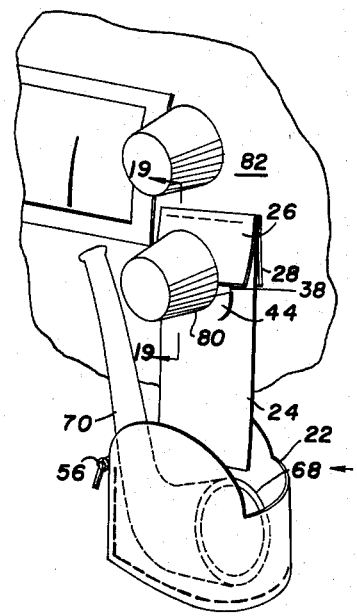
FIG. 18 is a perspective view of the pipe holder of this invention supported from a radio knob in an automobile.

Some of the uses of the pipe holder of this invention are shown in FIGS. 14, 16 and 18. In FIG. 14 the pipe holder is shown as being suspended from a man's belt 72. Thus, in this use, as also seen in FIG. 15, the belt is passed between downwardly projecting tab 26 and upwardly projecting tab 44. Since the tabs are made of a resilient, relatively stiff material, the pouch will be held securely in place. There are many occasions when this use of the pipe holder of this invention would be practical. Thus, when a man is not wearing a jacket this pipe holder may be the only practical way of carrying a pipe with him. Furthermore, even when wearing a jacket the pockets of the jacket will not be filled with loose charred tobacco since the pipe will not be carried therein. The leather thong 54 prevents the pipe from inadvertently being jarred out of the pouch when the user is walking.

In FIG. 16, the pipe holder is shown as being suspended from the front 74 of an ash tray 76 mounted in the dashboard 78 of an automobile. As best seen in FIG. 17, this mounting is accomplished merely by placing the front lip 74 of the ash tray between supporting strap 24 and rear tab 28. Again, since the tab is made of resilient, stiff material, the pipe holder will be held in place. The pipe holder can be similarly used by suspension from the front of a closed glove compartment of an automobile.

In FIG. 18, the pipe holder is shown as being suspended from knob 80 of a radio mounted in the dashboard 82 of an automobile. As seen in FIG. 19, this mounting is accomplished by passing knob 80 through opening 38 in strap 24. The pipe holder will then rest on shank 84 connected to radio knob 80. The pipe holder is held in place by tab 44 bearing against the bottom of shank 84 and tabs 26 and 28 bearing against the top of shank 84. In this connection it should be noted that tab 44 can be temporarily pushed out of place to permit the insertion of knob 80 through supporting strap 24. Having the tab 44 bearing against shank 84 prevents the pipe holder from lifting off the radio knob when the pipe is lifted out of the pouch.

The purpose of having openings 32 and 40 of a larger size than opening 30 is to permit the use of the pipe holder on shanks having large diameters. Thus, small diameter shanks will be fully received in openings 30 and 32 along with opening 40. Large diameter shanks will only be received in opening 32 along with opening 40. The smaller opening 30 will hide the large opening 32 in all instances when it is not necessary to take advantage of the larger opening. The larger opening 32 is also used when it is necessary to pass the strap over enlarged knobs which are the shape of buttons, such as on cabinets in the kitchen.

One of the features of this invention is that it is readily collapsible either for shipment or for storage, such as in a man's pocket. Thus, bottom 50 can easily be pushed out of place and pouch 22 collapsed. Likewise, strap 24 can easily be removed from the pouch 22.

As previously pointed out, the position of pouch 22 with respect to opening 40 is adjustable by varying the position of fingers 36 in slots 58. Thus, the overall length of the pipe holder is readily adjustable.

The pipe holder of this invention can be made of numerous materials. A preferred material is leather in view of its attractiveness, stiffness and resiliency while at the same time having the necessary flexibility. Thus, each of the elements of the pipe holder can be made of leather. If desired, the leather can be embossed or carved for attractiveness. However, any of the elements can be made of metal or plastic while obtaining the same results. Thus, if desired, a resilient metal such as steel can be used with all of the parts being riveted in place. Additionally, the metal can be plastic coated in a manner well known in the plastic art. If desired, the enire pipe holder can be made of a resilient plastic. If the pouch is made of metal it can be lined with a soft material such as fleece or mohair to prevent any scratching of the pipe. The resilient pouch will also provide a frictional grip on the pipe, thereby preventing its inadventent popping out.

It is thus seen that the pipe holder of this invention has numerous and varied uses. It can be used with complete safety in an automobile without any fear of scratching the pipe. The various suspending means used in connection with the supporting strap 24 make the pipe holder adaptable to being suspended from practically any surface. The upstanding shoulders 46 provide sufficient depth for the center of pouch 22 to insure that any size or shape bowl of a pipe can be securely received therein.

Obviously many modifications and variations of the present invention are possible in the light of the above teachings. It is, therefore, to be understood that within the scope of the appended claims, the invention may be practiced otherwise than specifically described.

What is claimed as the invention is:

1. A pipe holder comprising a pouch for holding a pipe, supporting means for said pouch, said supporting means comprising a strap having an opening formed at the top thereof and said pouch suspended from the bottom thereof, and securing means associated with said strap, said securing means comprising a tab secured to said strap and depending therefrom.

2. The pipe holder of claim 1 wherein said tab includes an arcuate opening formed in the bottom thereof.

3. The pipe holder of claim 1 wherein two tabs are provided, with one of said tabs being secured on the front face of said strap and the other of said tabs being secured on the rear face of said strap, each of said tabs having an arcuate opening formed in the bottom thereof.

4. The pipe holder of claim 3 wherein the opening in the strap includes an arcuate portion which is aligned with the openings in the depending tabs, said arcuate portion in the strap being of the same size and shape as the arcuate opening in the rear depending tab.

5. The pipe holder of claim 1 wherein said strap includes an upwardly extending tab adjacent said opening.

6. The pipe holder of claim 5 wherein said upwardly extending tab has a concave upper surface.

7. The pipe holder of claim 1 wherein said pouch comprises a bottom and front and rear vertical walls, with said strap being secured to one of said walls, said one of said walls including a plurality of parallel slots therein and said strap comprising means at the bottom thereof for engaging said slots to releasably support said pouch.

8. The pipe holder of claim 7 wherein said engaging means comprises at least one pair of fingers on said strap.

9. The pipe holder of claim 7 wherein said walls have a rim secured adjacent the lower edge thereof and said bottom of said pouch rests on said rim, whereby said pouch may be collapsed by removing said bottom from said rim.

10. The pipe holder of claim 7 and further including means within said pouch for releasably securing a pipe therein, said releasable securing means comprising a thong having one end thereof secured in one of said vertical walls with the other end thereof adapted to be releasably secured to said pouch.

11. The pipe holder of claim 1 wherein said pouch and strap comprise leather.

References Cited by the Examiner
UNITED STATES PATENTS

| 2,243,433 | 5/41 | McIntyre | 131—260 |
| 2,528,173 | 10/53 | Pinckney | 131—260 |
| 2,654,514 | 10/53 | Jensen | 224—26 |
| 2,784,887 | 3/57 | Habler | 224—29 |

GERALD M. FORLENZA, *Primary Examiner.*

HUGO O. SCHULZ, *Examiner.*